United States Patent [19]

Goldman et al.

[11] Patent Number: 4,745,605
[45] Date of Patent: May 17, 1988

[54] CONTROL WORD ERROR DETECTION AND CLASSIFICATION

[75] Inventors: Gary S. Goldman, San Jose; Mark W. Semmelmeyer, Sunnyvale, both of Calif.

[73] Assignee: Amadahl Corporation, Sunnyvale, Calif.

[21] Appl. No.: 897,922

[22] Filed: Aug. 19, 1986

[51] Int. Cl.⁴ .............................................. G06F 11/10
[52] U.S. Cl. ........................................ 371/49; 364/200
[58] Field of Search .................... 371/49, 51; 364/200, 364/900

[56] References Cited

U.S. PATENT DOCUMENTS

| | | | |
|---|---|---|---|
| 4,112,489 | 9/1978 | Wood | 364/200 |
| 4,253,147 | 2/1981 | MacDougall et al. | 364/200 |
| 4,346,435 | 8/1982 | Wise | 364/200 |
| 4,414,669 | 11/1983 | Heckelman et al. | 371/49 |

Primary Examiner—Charles E. Atkinson
Attorney, Agent, or Firm—Fliesler, Dubb, Meyer & Lovejoy

[57] ABSTRACT

In a data processing machine that generates a control word and that includes a plurality of registers connected to receive respective copies of the control word for execution in sections of the data processing machine, the present invention provides an apparatus for detecting an error condition in the execution of the control word. The apparatus detects an error in any of the respective copies of the control word. Further, a second means, responsive to the one copy of the control word in one register, is included for analyzing the one copy to identify a class of possible errors. Finally, responsive to the detection of an error in any of the respective copies and to the class of possible errors, a signal is generated indicating an error condition.

18 Claims, 2 Drawing Sheets

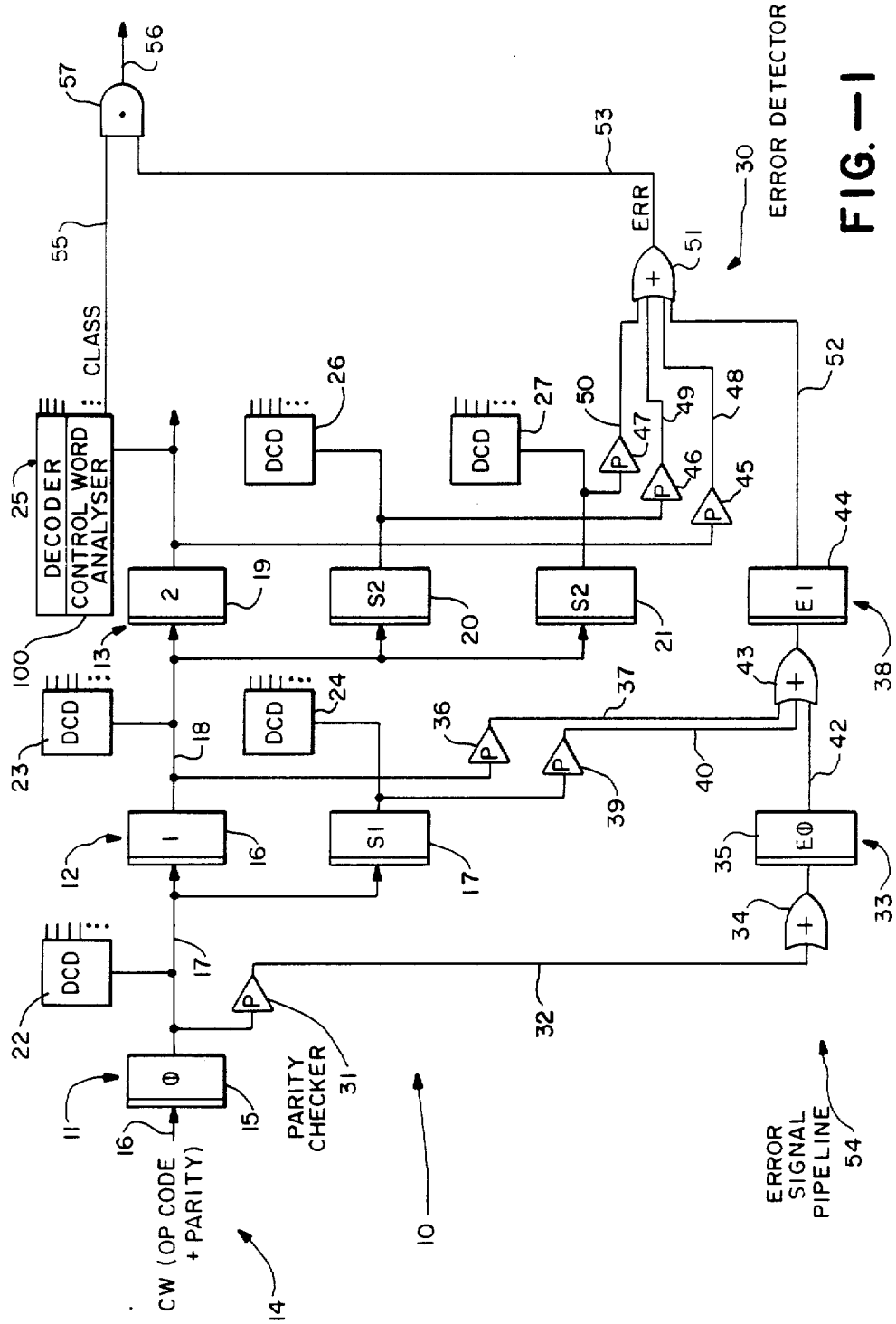

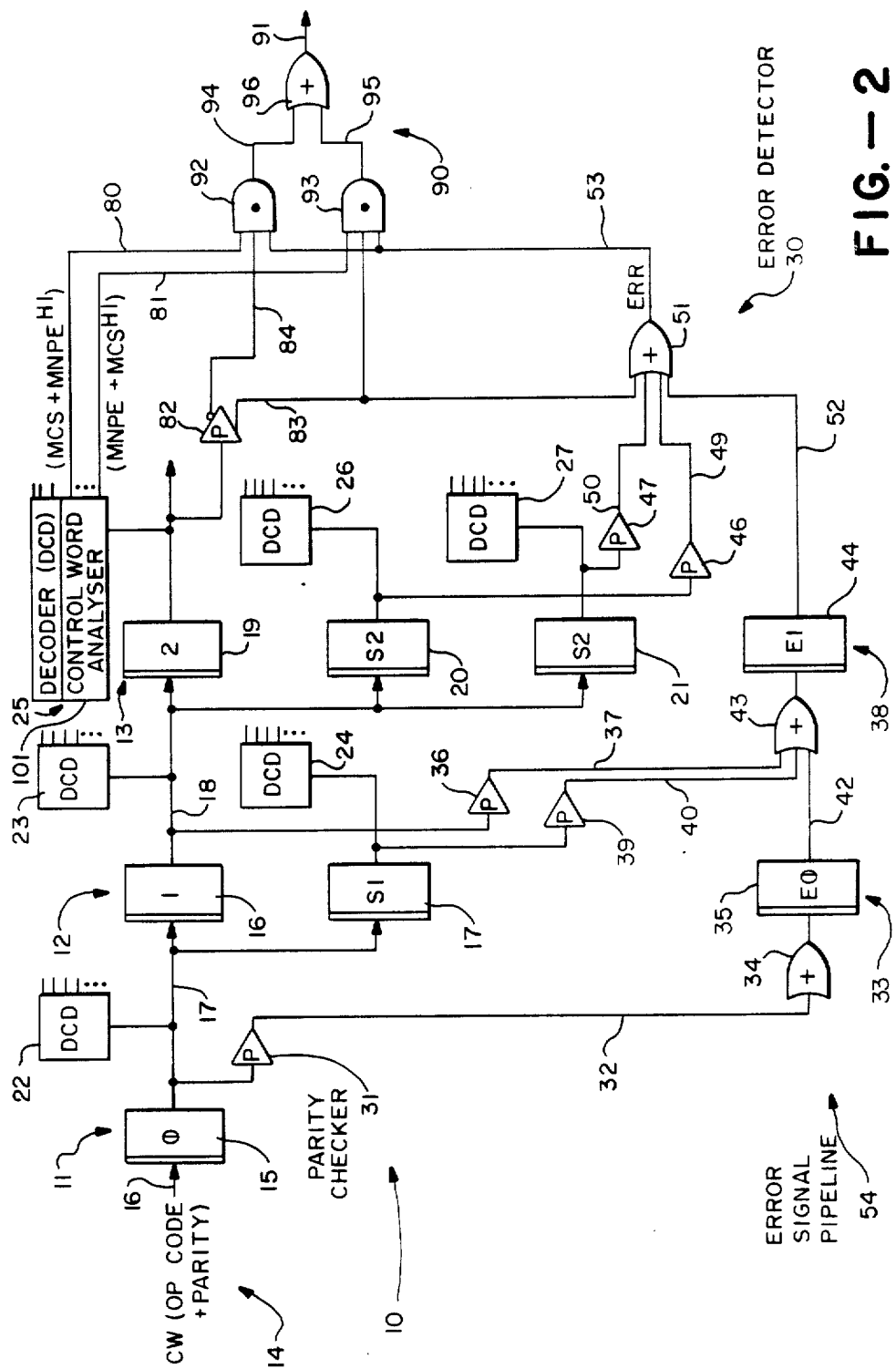

CONTROL WORD ERROR DETECTION AND CLASSIFICATION

FIELD OF THE INVENTION

The present invention relates to the detection and classification of errors that occur in control words generated in data processing machines. In particular, in data processing machines in which multiple copies of control words are used for execution of various parts of an operation, the present invention detects and classifies errors that occur in the multiple copies.

BACKGROUND OF THE INVENTION

High speed data processing machines typically generate control words which include an operation code OPCODE and an error code for identifying errors which occur in the OPCODE. The error code is typically a parity bit. The control words are supplied to numerous locations within the data processing machine for execution of various subparts of the desired operation. Errors can occur in any copy of the control word at any of the numerous locations.

In high speed machines, errors in control words are typically detected too late to prevent action by the machine on the erroneous control word. Therefore, it is necessary to detect the occurrence of an error as soon as possible and to classify the error according to the possible damage caused to the machine. Some control word errors are catastrophic, in that the associated control functions must not be performed unintentionally or must complete successfully in order to assure integrity of the machine.

Therefore, there is a need to detect the occurrence of errors in the multiple copies of the control word and to identify those errors that may fall within the catastrophic class of errors. Upon detection of errors that fall within this catastrophic class, the machine can react to mitigate the effect. For errors that fall outside the catastrophic class, the machine can typically continue to process following control words.

In this situation involving multiple copies of control words, prior machines might misclassify errors; such that any error in a copy of a control word had to be considered catastrophic leading to unneeded machine interruptions.

SUMMARY OF THE INVENTION

The present invention provides an apparatus for detecting and classifying errors in the multiple copies of control words for a high speed data processing machine that reduces the probability of an unneeded machine interruption.

Accordingly, in a data processing machine that generates a control word and that includes a plurality of registers connected to receive respective copies of the control word for execution in sections of the data processing machine, the present invention provides an apparatus for detecting an error condition in the execution of the control word. The apparatus comprises a first means, coupled to the plurality of registers and responsive to the respective copies of the control word, for detecting an error in any of the respective copies. Further, a second means, coupled to one of the plurality of registers and responsive to the one copy of the control word in the one register, is included for analyzing the one copy to identify a class of possible errors. Finally, means coupled to the first means and second means and responsive to the detection of an error in any of the respective copies and to the class of possible errors generates a signal indicating the error condition.

According to one aspect of the invention, the second means for analyzing the one copy of the control word includes means for performing a failed-from analysis and a failed-to analysis. The failed-from analysis involves identifying all possible control words a failure from which could result in the one copy. The failed-to analysis involves identifying all possible control words that the one copy could fail to. Based on the one copy and the possible failed-to analysis control words and the possible failed-from analysis control words, a class of possible errors is identified from the one copy. When the class of possible errors includes a catastrophic error and the first means detects the occurrence of an error in any of the copies, then an error signal is generated, indicating the error condition.

The failed-to and failed-from analysis can be conducted independently based on the detection of an error or not in the one copy of the control word upon which the analysis is performed.

Other objects, features and advantages of the present invention will become apparent upon consideration of the following detailed description and the accompany drawings.

BRIEF DESCRIPTION OF THE DRAWINGS

FIG. 1 illustrates one embodiment of the present invention in a high speed pipeline data processing machine.

FIG. 2 illustrates a second embodiment of the present invention in a high speed pipeline data processing machine.

DETAILED DESCRIPTION OF THE INVENTION

With reference to the figures, a detailed description of preferred embodiments of the present invention is provided.

FIG. 1 shows a portion of a high speed data processing machine 10 including a plurality of registers connected in a pipeline configuration. The pipeline includes stage zero 11, stage one 12 and stage N 13, where N is equal to 2. Each of the stages zero-N includes at least one register that receives a copy of a control word 14. Stage zero 11 includes a single register 15 which receives the control word on line 16 supplied by some part of the data processing machine, not shown. The copy of the control word stored in the register 15 is supplied over line 17 to a first register 16 in the stage one 12 and a second copy of the control word from line 17 is supplied to a second register 17, which is a "stub" off of stage one 12. The first register 16 in stage one 12 supplies a copy of the control word over line 18 to a first register 19 in stage two 13. A second register 20 and a third register 21 likewise receive copies of the control word from line 18. The second register 20 and third register 21 are stubs off of stage two 13 of the pipeline. As can be seen, stage zero has one register which receives one copy of the control word. Stage one 12 includes two registers 16, 17, each receiving a respective copy of the control word. Stage two 13 includes three registers 19, 20, 21, each receiving a respective copy of the control word. Of course, the pipeline can be arranged having any number of stubs on any of the stages.

The copy of the control word stored in the first register 15 of stage zero 11 is supplied to a decoder 22 for execution of a portion of the operation desired to be executed. In stage one 12, the copy of the control word stored in register 16 is supplied to decoder 23 for execution of a portion of the operation while the copy of the control word in register 17 is supplied to decoder 24 for execution of a portion of the operation. In stage two 13, the copy of the control word in register 19 is supplied to decoder 25 for execution of a portion of the operation. The copy of the control word in register 20 is supplied to decoder 26 for execution of a portion of the operation. The copy of the control word in register 21 is supplied to decoder 27 for execution of a portion of the operation. In sum, the data processing machine 10 shown in FIG. 1 generates a control word 14 that is staged through a plurality of pipeline stages zero-N including a first stage, stage zero 11, and an end-of-pipeline stage, stage N 13, where N=2. Each of the stages includes at least one register connected to receive a copy of the control word for execution of a portion of the operation in sections of the data processing machine not shown.

The control word 14 typically includes an operation code OPCODE plus a parity bit for detection of errors in the operation code. The invention includes means, generally shown at 30, coupled to the plurality of registers and responsive to the respective copies of the control word stored in the plurality of registers for detecting an error in any of the respective copies. The means 30 in the embodiment shown in FIG. 1 includes a parity checker for each of the plurality of registers.

Accordingly, register 15 in stage zero 11 includes parity checker 31 connected to receive the copy of the control word stored in register 15 for detecting a parity error. Upon detection of an error, an error signal is supplied on line 32 to a means 33 for storing the error signal. The means 33 for storing the error signal includes an OR gate 34 and an error register 35 for stage zero storing a stage zero error signal.

The first register 16 of stage one 12 includes a parity checker 36 connected to receive the copy of the control word stored in register 16 for checking parity. Upon detection of a parity error, an error signal is supplied on line 37 to means 38 for storing the error signal. In addition, a parity checker 39 is connected to receive the copy of the control word stored in register 17 for checking the parity. Upon detection of a parity error, an error signal is supplied on line 40 to the means 38 for storing the error signal. The output of the means 33 for storing the error signal from stage zero 11 is supplied across line 42 to the means 38 for storing the error signal. The means 38 includes OR gate 43 receiving as inputs the error signals from lines 37, 40 and 42. The output of the OR gate 43 is supplied to register 44 for storing a stage one error signal indicating the occurrence of an error in any of the plurality of registers in stages one 12 or zero 11. The pattern is continued for following stages until the end-of-pipeline stage N 13, where N=2, in FIG. 1.

In the end-of-pipeline stage two 13, parity checker 45 is connected to receive the copy of the control word stored in register 19, parity checker 46 is connected to receive the copy of the control word stored in register 20, and parity checker 46 is connected to receive the copy of the control word stored in register 21. Upon detection of an error in any of the respective copies, error signals are supplied over lines 48, 49 and 50, respectively, to OR gate 51. A fourth input to OR gate 51 is supplied over line 52 from the register 44 in the means 38 for storing an error signal from preceding stages. In the event of detection of an error in any of the plurality of stages in the data processing machine 10, an error signal is supplied over line 53.

Accordingly, the means 30 for supplying an error signal upon detection of an error in any of the plurality of copies of the control word includes an error signal pipeline 54 for piping error signals from preceding stages in the pipe to the end of the pipeline.

The decoder 25 connected to receive a copy of the control word stored in the first register 19 of the end-of-pipeline stage 13 includes a means (control word analyzer 100) for identifying a possible class of errors on line 55 based on decode of the one copy of the control word that arrives at the end of the pipeline. Upon identification of a class of possible errors on line 55 and the detection of an error across line 53 in any of the plurality of registers in the machine, the present invention generates a signal on line 56 indicating an unrecoverable error condition. The signal is supplied on line 56 at the output of AND gate 57. AND gate 57 receives as inputs a signal on line 55 indicating a class of possible errors and a signal on line 53 indicating the occurrence of an error in any of the plurality of registers.

The control word analyzer 100 performs an analysis of the opcode within the control word which arrives at stage N 13 in register 19 at the end of the pipe. The end of the pipe opcode from register 19 may or may not show an error. However, because the data processing machine 10 includes stubs at some stages, an error may occur that does not appear in the one copy of the opcode from register 19. Hence, there are two cases for analysis.

In the first case, the opcode from register 19 at the end of the pipe shows an error. In this case it is known what the opcode failed to. The analysis assumes that this is the only failure in the system. The erroneous opcode is analyzed in two ways:

1. Since it is known what the opcode failed to, it is understood which control points may have been erroneously activated due to the unintentionally performed opcode.

2. It is not known directly what the opcode failed from; however, it can be determined by analyzing all opcodes which are a Hamming distance of 1 from the erroneous opcode, i.e. all opcodes which a single bit error in the one copy of the opcode from register 19 would generate. For an 8-bit opcode, a set of 8 possible "failed-from" opcodes are supplied. One of the 8 "failed-from" opcodes was intended and its functions were erroneously not performed.

In the second case, the end-of-pipeline opcode from register 19 does not show an error. In this case, it is assumed that the failure occurred on a stub of the pipeline and that the end-of-pipeline opcode from register 19 is correct. This correct end-of-pipeline opcode is analyzed as follows:

1. Since it is known what the opcode failed from, it can be determined that some functions specified by this opcode were erroneously not performed due to the error on the stub.

2. It is not known what the opcode failed to; however, all opcodes which are a Hamming distance of 1 from the correct end-of-pipeline opcode can be determined. This gives us, for an 8-bit opcode, a set of 8 possible "failed to" opcodes, one of whose functions were unintentionally performed.

This analysis is used to separate partially recoverable from completely unrecoverable opcode errors. An unrecoverable error arises only when the system data integrity is compromised. From the system opcodes, two special groups of opcodes are assembled. First, a "must not perform unintentionally" group MNPU is identified consisting of those opcodes whose associated functions are so sensitive that if unintentionally performed, data integrity will be compromised. Second, a "must complete successfully" group MCS is identified which consists of those opcodes whose associated functions must be accurately completed. If any functions of an MCS opcode are not completed, then data integrity is assumed to be compromised.

In the embodiment shown in FIG. 1, the system combines both of these groups into a single group and generates an error signal indicating an error condition if the end-of-pipe opcode from register 19 is in the must not perform unintentionally group, the must complete successfully group, or a Hamming distance of one away from any opcode in either of these groups and if an error has occurred in any of the registers.

Therefore, in response to a class of possible errors that could occur based on the one copy of the opcode and upon the detection of an error in any of the copies, the signal is generated on line 56 indicating that an error condition is present.

The preferred embodiment is further characterized by partitioning opcodes that fall within the must not perform unintentionally group or the must complete successfully group from less sensitive opcodes used by the system. By partitioning, all combinations of bits that could be generated by a single bit error in an opcode in the must not perform unintentionally or must complete successfully groups are reserved or used only for rarely executed opcodes. This way, a less sensitive opcode cannot fail to an opcode in the more sensitive group due to a single bit error.

Accordingly, all opcodes in the sensitive groups are coded so that they are at least a Hamming distance of 2 away from opcodes in less sensitive groups.

Table 1 illustrates a set of 8-bit opcodes which is partitioned into a more sensitive group and a less sensitive group, the more sensitive group being a Hamming distance of 2 away from all opcodes in the less sensitive group. Any opcodes that fall within a Hamming distance of 1 from the more sensitive group, and that are not used as opcodes within the more sensitive group, are opcodes that should not be assigned, or if assigned used only rarely.

TABLE 1

| Example Partitioning Of Opcodes | | | |
|---|---|---|---|
| Code | Parity | Code | Parity |
| A. "More sensitive" group | | | |
| 00000100 | 0 | 00111000 | 0 |
| 00000110 | 1 | 00111001 | 1 |
| 00000111 | 0 | 00111010 | 1 |
| 00100001 | 1 | 00111011 | 0 |
| 00100010 | 1 | | |
| 00100011 | 0 | | |
| 00100100 | 1 | | |
| 00100101 | 0 | | |
| 00100110 | 0 | | |
| 00100111 | 1 | | |
| 00101000 | 1 | | |
| 00101001 | 0 | | |
| 00101010 | 0 | | |

TABLE 1-continued

| Example Partitioning Of Opcodes | | | |
|---|---|---|---|
| Code | Parity | Code | Parity |
| 00101011 | 1 | | |
| 00101100 | 0 | | |
| 00101110 | 1 | | |
| 00110100 | 0 | | |
| 00110110 | 1 | | |
| 00110111 | 0 | | |
| B. "Less sensitive" group | | | |
| 11000000 | 1 | 11100001 | 1 |
| 11000001 | 0 | 11100010 | 1 |
| 11000100 | 0 | 11100011 | 0 |
| 11000101 | 1 | 11100100 | 1 |
| 11000110 | 1 | 11100101 | 0 |
| 11000111 | 0 | 11100110 | 0 |
| 11001000 | 0 | 11100111 | 1 |
| 11001001 | 1 | 11101000 | 1 |
| 11001010 | 1 | 11101001 | 0 |
| 11001011 | 0 | 11101010 | 0 |
| 11001100 | 1 | 11101011 | 1 |
| 11001101 | 0 | 11101100 | 0 |
| 11001110 | 0 | 11101101 | 1 |
| 11001111 | 1 | 11101110 | 1 |
| 11010000 | 0 | 11101111 | 0 |
| 11010001 | 1 | 11110001 | 0 |
| 11010010 | 1 | 11110010 | 0 |
| 11010011 | 0 | 11110011 | 1 |
| 11010100 | 1 | 11110100 | 0 |
| 11010101 | 0 | 11110101 | 1 |
| 11010110 | 0 | 11110110 | 1 |
| 11010111 | 1 | 11110111 | 0 |
| 11011000 | 1 | 11111000 | 0 |
| 11011001 | 0 | 11111001 | 1 |
| 11011010 | 0 | 11111010 | 1 |
| 11011100 | 0 | 11111011 | 0 |
| 11011101 | 1 | 11111100 | 1 |
| 11011110 | 1 | 11111101 | 0 |
| 11011111 | 0 | 11111110 | 0 |
| 11100000 | 0 | 11111111 | 1 |

To design a system with more than two opcode groups, it is necessary to partition the groups to be a Hamming distance of three; i.e., any opcode in one group is Hamming distance-three from any opcode in a different group, and all opcodes in between are invalid. This allows any number of groups to be defined.

With this distance-three scheme, the end-of-pipeline logic can actually tell exactly which group the opcode came from. If the end-of-pipe opcode shows no error, the source group is known (trivially). If the end-of-pipe opcode shows an error, then it is easy to use well-known error correction techniques to determine the source group. Note that we could still use parity over the entire opcode to detect an error anywhere in the code. Also note that this scheme also works only for single faults.

This distance-three method can also be applied to the two-group case; it has slightly better coverage, and slightly higher cost than the distance-two method.

The following is an example coding with four distinct groups (the x's represent bits to encode the specific word within the group):

group 1: 00000xxxxxxxx
group 2: 01011xxxxxxxx
group 3: 10101xxxxxxxx
group 4: 11110xxxxxxxx FIG. 2 illustrates an alternative embodiment of the invention in which the opcodes in the must not perform unintentionally group and the opcodes in the must complete successfully group are not the same set of opcodes as was the case in the embodiment of FIG. 1. In order to simplify description of this second embodiment, FIG.

2 illustrates a data processing machine 10 using the same reference numerals as are used in FIG. 1 for like components. A detailed description of the data processing machine 10 is not provided again, but as can be seen from the figures, the functions are the same except as discussed below. The apparatus in FIG. 2 also includes the means 30 for generating an error signal on line 53 indicating an error in any of the respective copies of the control word. The means 30 includes the error pipeline 54, as well.

The difference between the embodiment of the invention shown in FIG. 2 and that shown in FIG. 1 can be seen in the end-of-pipeline stage 13. The decoder 25 includes a means 101 for analyzing the one copy of the opcode from register 19 to determine whether it is in one of two subclasses. The first subclass includes all opcodes in the must complete successfully group or a Hamming distance of 1 from the must not complete unintentionally group ($MCS + MNPU^{H1}$). Upon detection of an opcode that falls within this first subclass, a signal is supplied on line 80. The second subclass includes all opcodes that fall within the must not perform unintentionally group or that are within a Hamming distance of 1 from the must complete successfully group ($MNPU + MCS^{H1}$). Upon detection of an opcode within the second subclass, a signal is generated on line 81.

In addition, a parity checker 82 is connected to receive the one copy of the end-of-pipeline opcode from register 19. Upon the detection of an error, a true signal is supplied on line 83 and a false signal is supplied on line 84. When there is no error, a true signal is supplied on line 84 while a false signal is supplied on line 83. The means 90 for generating a signal indicating an error condition on line 91 includes a first AND gate 92 and a second AND gate 93. The inputs to the first AND gate include line 80 supplying a signal indicating that the opcode in register 19 falls within the first subclass including the must complete successfully group and opcodes within a Hamming distance of 1 from the must not perform unintentionally group. The second input includes the line 84 providing a complement output of parity checker 82 which goes true when there is no error in the copy of the opcode in register 19. The third input is the error signal from line 53 indicating the occurrence of an error in any of the plurality of copies of the opcode. Accordingly, the output 94 of the AND gate 92 goes true, when there is no error in the copy of the opcode from register 19, an error occurred somewhere in the plurality of copies and the opcode from register 19 falls within the first subclass.

The inputs to AND gate 93 include line 81 indicating that the opcode in register 19 falls within the second subclass including the must not perform unintentionally group and opcodes within a Hamming distance of 1 from the must complete successfully group. The second input is line 83 from the parity checker 82 which goes high upon the detection of an error in the copy of the opcode from register 19. The third input to AND gate 93 is line 53 which indicates the occurrence of an error in any of the plurality of copies of the opcode. Accordingly, the output 95 of AND gate 93 goes true when there is an error in the opcode from register 19, the opcode from register 19 is within the second subclass and an error has occurred anywhere within the plurality of registers. The signals on lines 94 and 95 are supplied as inputs to OR gate 96 which supplies at its output on line 91 the error signal indicating the error condition.

The Control Word Analyzer 100, 101 in both the embodiments of FIG. 1 and FIG. 2 can be implemented as a table look-up mechanism which stores in a table, such as in a read-only memory device, a list of all opcodes that could result in the class of possible errors to be decoded. The copy of the opcode from register 19 is then compared against all of the opcodes in the table to determine whether a match occurs. Upon detection of a match, the signal is generated to indicate that the class of possible errors that could occur based on the opcode from register 19 is a serious one. A table lookup mechanism is easily incorporated into the standard decoder 25 in the embodiment shown in FIGS. 1 and 2. Of course, there could be other implementations of the decoder 25 as is known in the art.

Conclusion

The invention described above operates to classify and to mitigate the effects of uncorrectable errors in opcodes in a data processing machine. The invention includes partitioning the opcode space so that most sensitive opcodes are a Hamming distance greater than 1 from less sensitive opcodes. This separation is important for the damage classification decoder. Further, this partitioning minimizes the amount of damage likely to occur because less sensitive opcodes which are the bulk of possible opcodes cannot fail to a more sensitive opcode due to single bit failures.

The invention is particularly suited to pipeline machines by including an opcode error pipeline 54 which corresponds stage for stage with the data processing pipeline. All opcode errors detected in any stage of the pipeline are funneled synchronously into the opcode error pipeline for supply at the end of the pipeline.

Finally, an end-of-the-pipeline failure analysis is conducted as described in detail above.

It should be noted that the implementations described above are conservative in classifying damage. For instance, if the end-of-pipeline copy of the opcode shows no error, and it is a Hamming distance of 1 from any opcode that is in the must not perform unintentionally group, then unrecoverable damage is assumed. This will cause the generation of some unrecoverable damage signals even when no unrecoverable damage has occurred. However, in an unstructured opcode space, almost any opcode might be a Hamming distance of 1 from at least one must not perform unintentionally opcode. By structuring the opcode space so that the sensitive opcodes (typically few in number) are at least a Hamming distance of 2 from less sensitive ones, then in fact most opcodes which are one bit away from any must not perform unintentionally opcode or must complete successfully opcode are themselves in these sensitive groups.

In the embodiments discussed, the error detection is performed using parity, and only single bit errors are detected. Further, the machine is only assured to perform correctly when there has been only one error among all the copies of the opcode. However, as known in the art, the invention can be adapted to other more comprehensive or different error detection schemes.

According to the invention, significant performance enhancement is gained with relatively small hardware cost. The performance enhancement provided is greater for systems in which the frequency of use and number of opcodes that fall within the more sensitive group or groups is small compared to those parameters for the less sensitive group or groups.

The foregoing description of the preferred embodiment of the present invention has been presented for purposes of illustration. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. In a data processing machine that generates a control word and that includes a plurality of registers connected to receive respective copies of the control word for execution in sections of the data processing machine, an apparatus for detecting an error condition in the execution of the control word, comprising:

first means, coupled to the plurality of registers and responsive to the respective copies of the control word, for detecting an error in any of the respective copies;

second means, coupled to one of the plurality of registers and responsive to the one copy of the control word in the one register, for analyzing the one copy to identify a class of possible errors; and means, coupled to the first means and the second means and responsive to the detection of an error in any of the respective copies and to the class of possible errors, for generating a signal indicating the error condition.

2. The apparatus of claim 1, wherein the control word includes an operation code and a parity bit for the operation code; and the first means for detecting an error includes means for detecting parity errors in the operation code.

3. The apparatus of claim 1, wherein there are a plurality of possible control words, the plurality including a sensitive group of control words which upon the occurrence of an error could lead to the error condition and a less sensitive group of control words which upon occurrence of an error would not lead to the error condition; and the second means for analyzing the one copy of the control word includes means for determining whether the one copy was included within the sensitive group.

4. The apparatus of claim 3, wherein the control words in the less sensitive group are logically partitioned from the control words in the sensitive group so that a single error that changes a control word in the less sensitive group cannot result in a control word in the sensitive group.

5. The apparatus of claim 1, wherein the means for analyzing the one copy of the control word includes means for determining whether or not an error has occurred in the one copy; and the means for generating a signal indicating the error condition is responsive to the determination of whether or not an error occurred in the one copy.

6. The apparatus of claim 1, wherein there are a plurality of possible control words, the plurality including a sensitive group of control words which upon the occurrence of an error could lead to the error condition and a less sensitive group of control words which upon occurrence of an error would not lead to the error condition; and the sensitive group of control words includes a first subclass that must not be performed unintentionally in the data processing machine, and a second subclass that must be completed successfully once generated by the data processing machine; and wherein the means for analyzing the one copy of the control word includes means for determining whether or not an error has occurred in the one copy;

means for determining whether or not the one copy is included within a first group including the first subclass and all control words within a Hamming distance of 1 from the second subclass; and means for determining whether or not the one copy is included within a second group including the second subclass and all control words within a Hamming distance of 1 from the first subclass; and wherein the means for generating a signal indicating the error condition includes means for enabling the signal when the one copy falls within the first group and an error is present in the one copy, and when the one copy falls within the second group and an error is not present in the one copy.

7. The apparatus of claim 6, wherein the control words in the less sensitive group are logically partitioned by a Hamming distance of at least two from the control words in the sensitive group.

8. The apparatus of claim 1, wherein there are a plurality of groups of control words, the groups being logically partitioned so that a single error in any control word in one group will not lead to unintentional execution of a control word in another group; and the analyzing means is responsive to the group from which or to which the control word failed.

9. The apparatus of claim 1, wherein there are a plurality of groups of control words, the groups being logically partitioned by a Hamming distance of at least three so that a single error in any control word in one group will not lead to unintentional execution of a control word in another group; and the analyzing means is responsive to the group from which the control word failed.

10. In a pipelined data processing machine that generates a control word that is staged through a plurality of pipeline stages including a first stage and an end of pipeline stage, the first stage including at least one register receiving a copy of the control word, each other stage including at least one register connected to receive a respective copy of the control word from one register in a preceding stage, an apparatus for detecting an error condition in the end of pipeline stage, comprising:

an error signal pipeline, including means connected to the first stage for generating a first stage error signal indicating an error in any of the copies of the control word in registers of the first stage and means for storing the first stage error signal;

means, connected to respective pipeline stages other than the first and end of pipeline stages and receiving a preceding stage error signal, for generating a respective stage error signal indicating an error in any of the copies of the control word in registers of the respective pipeline stage or in any preceding stage, and means for storing the respective stage error signal; and means connected to the end of pipeline stage and receiving a preceding stage error signal for generating an end of pipeline stage error signal indicating an error in any of the copies of the control word in any of the registers in any of the stages of the pipeline;

control word analyzing means, coupled to one of the plurality of registers in the end of pipeline stage and responsive to the one copy of the control word in the one register, for analyzing the one copy to identify a class of possible errors; and means, coupled to the error signal pipeline and the control word analyzing means and responsive to the end of pipeline stage error signal and to the class of possible errors, for generating a signal indicating the error condition.

11. The apparatus of claim 10, wherein the control word includes an operation code and a parity bit for the operation code; and the respective means for generating stage error signals includes means for detecting parity errors in the operation code.

12. The apparatus of claim 10, wherein there are a plurality of possible control words, the plurality including a sensitive group of control words which upon the occurrence of an error could lead to the error condition and a less sensitive group of control words which upon occurrence of an error would not lead to the error condition; and the control word analyzing means for analyzing the one copy of the control word includes means for determining whether the one copy was included within the sensitive group.

13. The apparatus of claim 12, wherein the control words in the less sensitive group are logically partitioned from the control words in the sensitive group so that a single error that changes a control word in the less sensitive group cannot result in a control word in the sensitive group.

14. The apparatus of claim 10, wherein the control word analyzing means includes means for determining whether or not an error has occurred in the one copy; and the means for generating a signal indicating the error condition is responsive to the determination of whether or not an error occurred in the one copy.

15. The apparatus of claim 10, wherein there are a plurality of possible control words, the plurality including a sensitive group of control words which upon the occurrence of an error could lead to the error condition and a less sensitive group of control words which upon occurrence of an error would not lead to the error condition; and the sensitive group of control words includes a first subclass that must not be performed unintentionally in the data processing machine, and a second subclass that must be completed successfully once generated by the data processing machine; and wherein the means for analyzing the one copy of the control word includes means for determining whether or not an error has occurred in the one copy;

means for determining whether or not the one copy is included within a first group including the first subclass and all control words within a Hamming distance of 1 from the second subclass; and means for determining whether or not the one copy is included within a second group including the second subclass and all control words within a Hamming distance of 1 from the first subclass; and wherein the means for generating a signal indicating the error condition includes means for enabling the signal when the one copy falls within the first group and an error is present in the one copy, and when the one copy falls within the second group and an error is not present in the one copy.

16. The apparatus of claim 15, wherein the control words in the less sensitive group are logically partitioned by a Hamming distance of at least two from the control words in the sensitive group.

17. The apparatus of claim 10, wherein there are a plurality of groups of control words, the groups being logically partitioned so that a single error in any control word in one group will not lead to unintentional execution of a control word in another group; and the analyzing means is responsive to the group from which or to which the control word failed.

18. The apparatus of claim 10, wherein there are a plurality of groups of control words, the groups being logically partitioned by a Hamming distance of at least three so that a single error in any control word in one group will not lead to unintentional execution of a control word in another group; and the analyzing means is responsive to the group from which the control word failed.

* * * * *